(12) United States Patent
Ernst et al.

(10) Patent No.: US 7,862,412 B2
(45) Date of Patent: Jan. 4, 2011

(54) SEAL ASSEMBLIES FOR GRAIN SEPARATORS

(75) Inventors: Matthew J. Ernst, North Oaks, MN (US); Matthew T. Haberman, Mahtomedi, MN (US)

(73) Assignee: Carter Day International, Inc., Minneapolis, MN (US)

( * ) Notice: Subject to any disclaimer, the term of this patent is extended or adjusted under 35 U.S.C. 154(b) by 12 days.

(21) Appl. No.: 12/488,646

(22) Filed: Jun. 22, 2009

(65) Prior Publication Data
US 2009/0318204 A1 Dec. 24, 2009

Related U.S. Application Data

(60) Provisional application No. 61/074,402, filed on Jun. 20, 2008.

(51) Int. Cl.
*A01F 12/44* (2006.01)
(52) U.S. Cl. .......................................... 460/79; 277/390
(58) Field of Classification Search .................. 460/79, 460/80, 81, 83; 209/687; 277/370, 371, 277/377, 390, 379, 394
See application file for complete search history.

(56) References Cited

U.S. PATENT DOCUMENTS

| 7,174 | A | 3/1850 | Menefee |
|---|---|---|---|
| 37,319 | A | 1/1863 | Cochrane |
| 137,430 | A | 4/1873 | Foreman |
| 171,525 | A | 12/1875 | Merritt |
| 310,335 | A | 1/1885 | Tracy |
| 1,683,918 | A | 9/1928 | Riddell |
| 2,015,400 | A | 9/1935 | Ingraham |
| 2,135,343 | A | 11/1938 | Johnson |
| 2,182,638 | A | 12/1939 | Mjolsness |
| 2,833,572 | A | 5/1958 | Moseley |
| 2,861,684 | A | 11/1958 | MacGillivray |
| 3,072,414 | A | 1/1963 | Porges |
| 3,612,273 | A | 10/1971 | Pritchett |
| 4,392,421 | A | 7/1983 | Yano et al. |
| 4,392,500 | A | 7/1983 | Houle |
| 4,441,412 | A | 4/1984 | Imamura et al. |
| 4,574,815 | A | 3/1986 | West et al. |
| 4,722,445 | A | 2/1988 | Edholm et al. |
| 4,722,558 | A | 2/1988 | Badoureaux |
| 4,730,554 | A | 3/1988 | Kristiaan |
| 5,087,101 | A | 2/1992 | Justice et al. |

(Continued)

OTHER PUBLICATIONS

Carter Day Assembly, Oct. 18, 1979.

(Continued)

*Primary Examiner*—Robert E Pezzuto
(74) *Attorney, Agent, or Firm*—Fredrikson & Byron, P.A.

(57) ABSTRACT

The invention provides for a seal assembly for a grain separator. The grain separator may include a housing, a rotatable grain separation cylinder within the housing, the cylinder having an end surface, a grain inlet having an inlet spout extending through the end surface for conveying grain into the cylinder in a feed zone, an auxiliary end piece or seal cone functionally connected to the end surface of the cylinder. The auxiliary end piece may have an annular external surface spaced laterally from the feed zone, and a seal interfacing with the annular external surface, thereby defining a seal zone spaced laterally from the feed zone. Such grain separators have increased capacity compared to separators with traditional seal assemblies.

20 Claims, 4 Drawing Sheets

U.S. PATENT DOCUMENTS

| | | | |
|---|---|---|---|
| 5,116,066 | A | 5/1992 | Crawford |
| 5,335,792 | A | 8/1994 | Hauch |
| 5,403,020 | A | 4/1995 | McOnie |
| 5,816,624 | A | 10/1998 | Smith |
| 6,050,788 | A | 4/2000 | McEwen et al. |
| 6,217,028 | B1 * | 4/2001 | Wilke .................... 277/370 |
| 7,029,393 | B2 | 4/2006 | Hauch et al. |

OTHER PUBLICATIONS

Simon-Carter Receiving Head, Jan. 22, 1963.
Simon-Carter Cylinder Conveyer, Apr. 22, 1959.
Heid Machine, date unknown (4 pages).

* cited by examiner

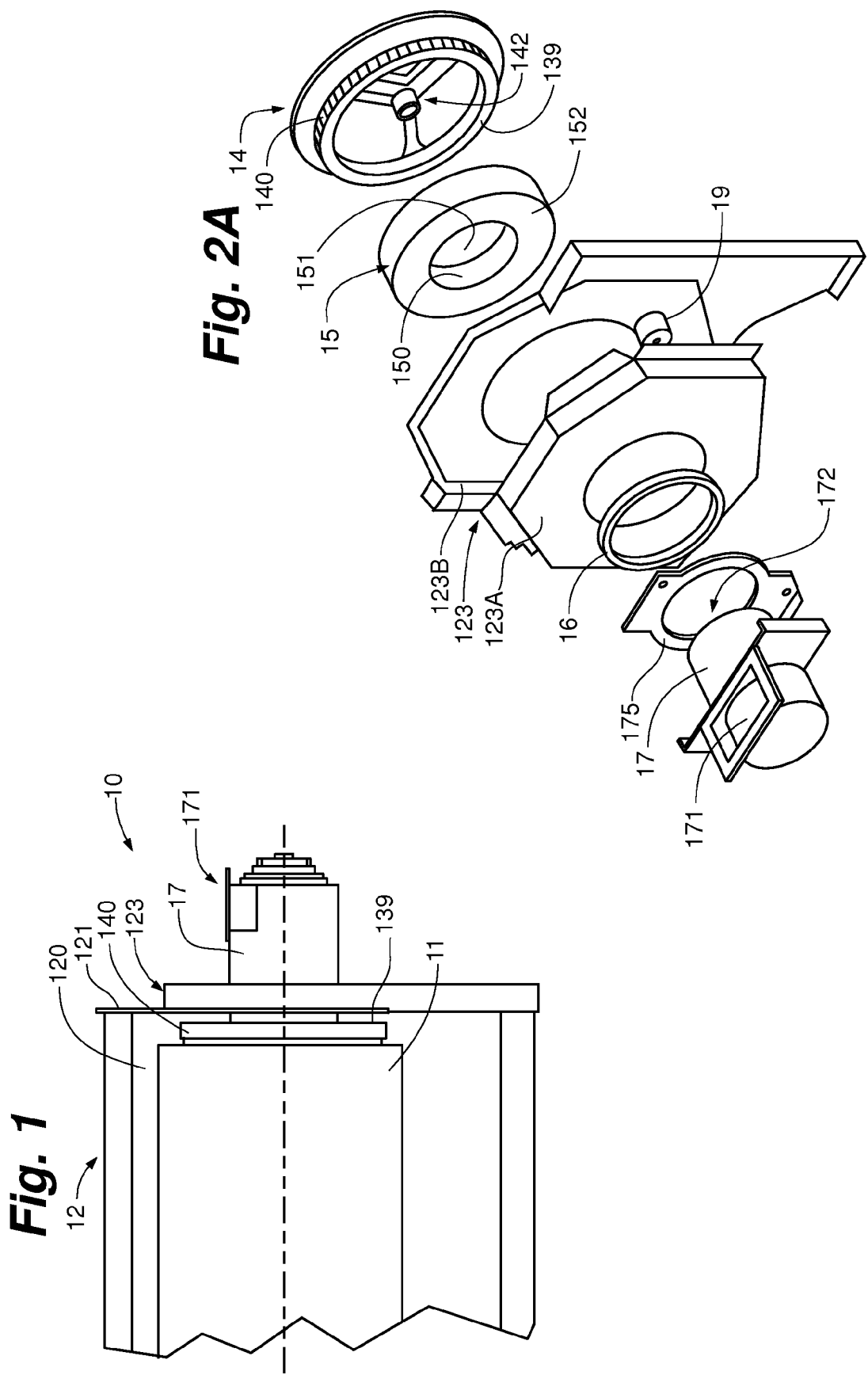

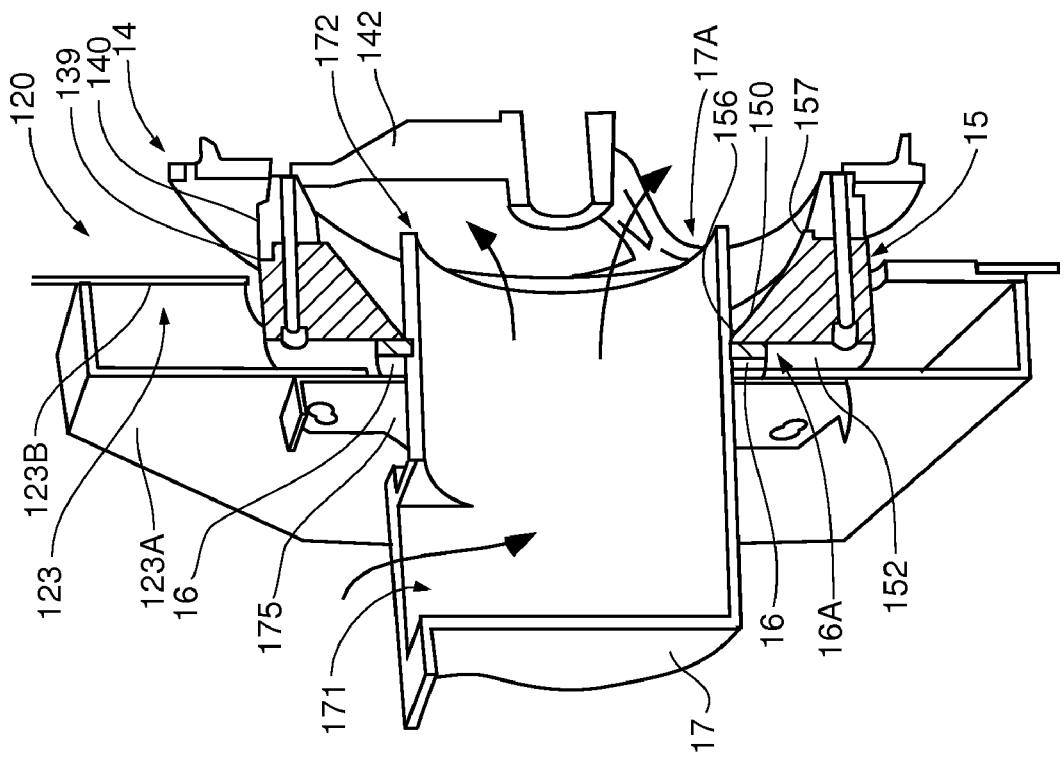
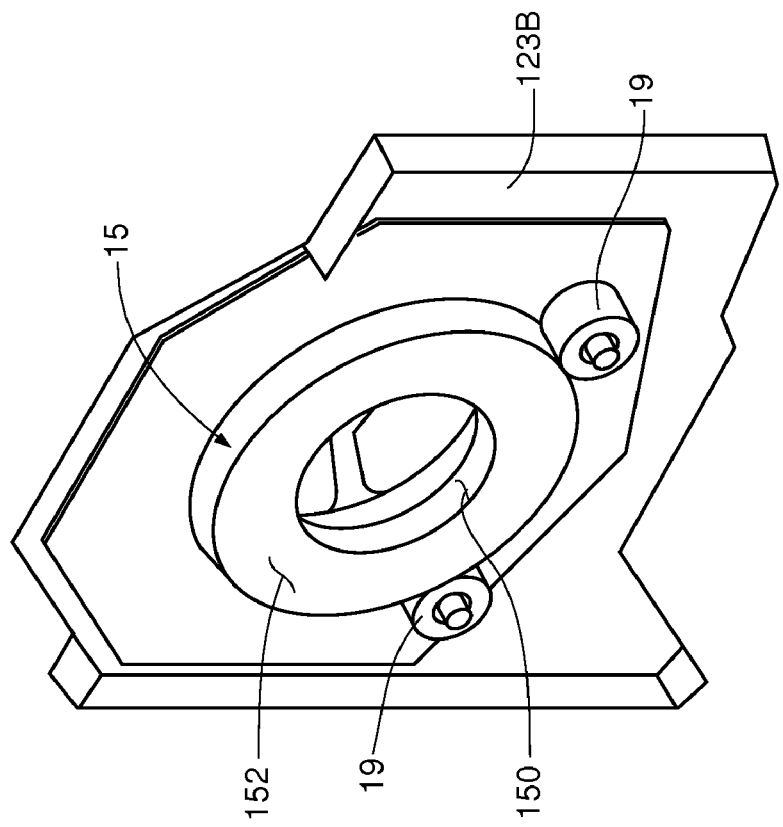

SEAL ASSEMBLIES FOR GRAIN SEPARATORS

RELATED APPLICATIONS

The present application claims the benefit of U.S. Provisional Application Ser. No. 61/074,402, titled Seal Cone Assemblies for Grain Separators, filed Jun. 20, 2008, the contents of which are hereby incorporated by reference.

TECHNICAL FIELD

The application relates to seal assemblies for grain separators.

BACKGROUND

Length grading machines, or grain separators, are typically used to separate a stream of grain containing various types and sizes of grain into its constituent parts, for example, wheat, durum, oats, barley and rice, and/or to separate such grains from other seed contaminants. These machines employ a rotating member, or cylinder, which is mounted in an interior space of a housing of the grain separator, and which includes lifting pockets, or indentations, located along an interior surface thereof. As the cylinder rotates, the indentations, according to their size, receive and lift particular lengths, or sizes, of granules out of a stream of grain and drop the granules into a trough that is mounted within the cylinder. The stream of grain is fed into the rotating cylinder by a spout, which extends through a sidewall of the housing and through an end piece of the indented cylinder. To prevent grain from leaking out, at an interface between the spout and the rotating cylinder, a seal is typically mounted about the spout so as to interface with an external surface of the cylinder end piece.

SUMMARY

According to embodiments of the present invention, an indented cylinder, which is located within an interior space of a housing of a grain separator, includes an auxiliary end piece, or seal cone. The seal cone includes an internal tapered surface defining an opening into which a spout of the grain separator extends, in order to feed grain into the cylinder, and an annular external surface, for interfacing with a seal, which is mounted around the spout. In some embodiments, a first end of the opening of the seal cone, which is located on a first side of the seal cone, has a first diameter and is surrounded by the annular external surface. A second end of the opening, which is located on a second side, opposite the first side of the seal cone, has a second diameter, which is larger than the first diameter, by virtue of the internal tapered surface. An outlet of the spout is located in proximity to the second side of the seal cone. The seal cone serves to effectively separate the area where the grain enters the cylinder (the feed zone) from the seal location (the seal zone).

According to some embodiments, a sidewall of the housing defines a standoff section of the housing, and the seal zone is located outside the interior space of the housing. The seal cone, in these embodiments, may be supported on trunnions which are mounted within the standoff section of the housing. According to some alternate embodiments, the sidewall of the housing defines the interior space of the housing, and the seal zone is located within the interior space.

Thus, the seal cone may serve to separate a seal zone, from a feed zone, where the spout feeds grain into the separator, at a lateral distance that reduces the potential for grain to come into contact with the seal zone. Reducing the contact between the grain and the seal reduces the amount of grain bypassing the seal. Accordingly, embodiments of the invention have higher capacity than grain separators with traditional seal locations because larger amounts of grain can be pushed through the machine without contacting the seal. Further, in embodiments where the seal cone has an internal tapered surface angled towards the interior of the cylinder, grain must work against gravity to come into contact with the seal, and any grain entering the seal zone will tend to slide down the internal tapered surface away from the seal zone. Accordingly, embodiments of the invention provide for greater grain throughput rates than comparable prior art length grading machines having traditional seal assembly locations.

BRIEF DESCRIPTION OF THE DRAWINGS

The following drawings are illustrative of particular embodiments of the invention and therefore do not limit the scope of the invention. The drawings are not to scale (unless so stated) and are intended for use in conjunction with the explanations in the following detailed description. Embodiments of the invention will hereinafter be described in conjunction with the appended drawings, wherein like numerals denote like elements.

FIG. 1 is a side elevation view of a portion of a grain separator with a cut-away section.

FIG. 2A is an exploded perspective view of an assembly for mounting an indented cylinder, in conjunction with a spout, to a housing of the grain separator, according to some embodiments of the present invention.

FIG. 2B is a perspective view of an assembled seal cone of the assembly shown in FIG. 2A, according to some embodiments.

FIG. 2C is a perspective cross-section view through the assembled assembly of FIG. 2A, according to some embodiments.

DETAILED DESCRIPTION

Figure 3A:
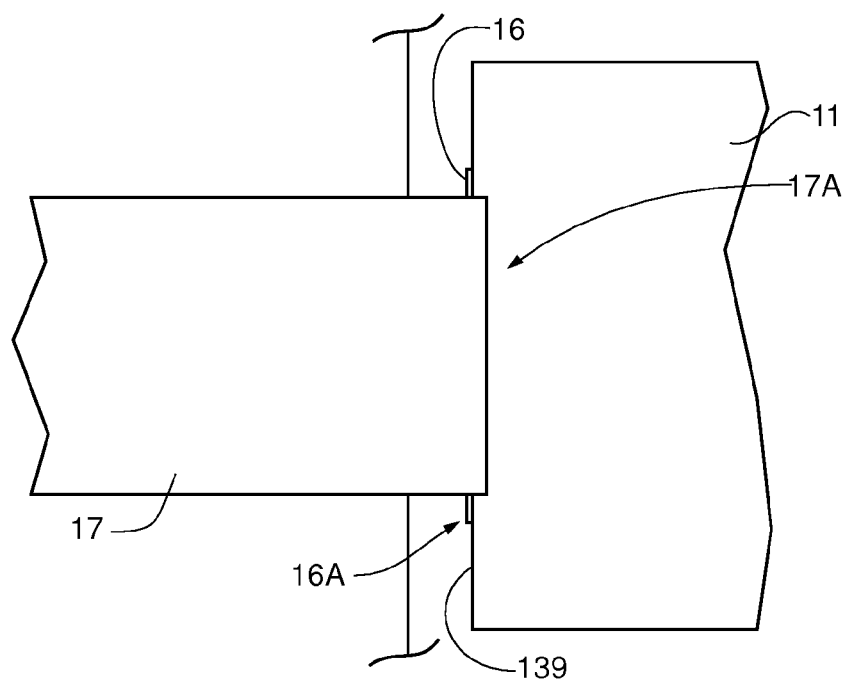
FIG. 3A is a simplified schematic drawing showing the lateral seal location in a prior art grain separator.

The following detailed description is exemplary in nature and is not intended to limit the scope, applicability, or configuration of the invention in any way. Rather, the following description provides practical illustrations for implementing exemplary embodiments. Utilizing the teaching provided herein, those skilled in the art will recognize that many of the examples have suitable alternatives that can be utilized.

FIG. 1 is a side elevation view of a portion of a grain separator 10 with a cut-away section. FIG. 1 illustrates grain separator 10 including an indented cylinder 11 mounted within an interior space 120 of a housing 12. Cylinder 11 has an end surface 139, through which grain is conveyed into the interior of the cylinder. Note that end surface 139 may be on a separate piece, such as end piece 14, connected to cylinder 11 (as shown in FIG. 2A and discussed further below). Although not shown, those skilled in the art will appreciate that a drive belt, which interfaces with an interface surface 140 of cylinder 11 (e.g., via end piece 14), may cause cylinder to rotate in order to separate grain which is fed into an inlet opening 171 of spout 17. FIG. 1 further illustrates housing 12 including a first sidewall 121, which defines interior space 120. Housing 12 can also include a standoff section 123. Spout 17 extends through standoff section 123 and sidewall 121 to an outlet opening 172, which can be seen in FIG. 2A.

FIG. 2A is an exploded perspective view of an assembly for mounting indented cylinder 11, in conjunction with spout 17, to housing 12, according to some embodiments of the present invention. FIG. 2A illustrates an end piece 14 of cylinder 11 which may include end surface/drive belt interface surface 140 and an internal spider structure 142, for supporting a screw drive shaft (not shown), and an end surface 139. Although not shown, those skilled in the art will appreciate that the screw drive extends within spout 17 to carry a stream of grain into cylinder 11 (FIG. 1); the screw drive, via fixation of the shaft thereof to spider structure 142, may be rotated in conjunction with cylinder 11, via the drive belt that interfaces with interface surface 140.

FIG. 2A further illustrates a seal cone 15, which attaches to end piece 14, according to embodiments of the present invention. Seal cone 15 may include an internal tapered surface 150, which defines an opening 151, and an annular external surface 152, which interfaces with a bearing surface of a seal 16. The seal cone 15 can comprise any suitable material, including metal (e.g., steel, aluminum) and/or polymer (e.g., urethane). In some embodiments, seal cone 15 is bolted directly to end piece 14. With further reference to FIG. 2A, standoff section 123 is defined by the volume contained within a first sidewall portion 123A and a second sidewall portion 123B, and a trunnion 19 is shown attached to the second sidewall portion 123B.

FIG. 2B is a perspective view of seal cone 15 incorporated into the assembly of FIG. 2A, according to some embodiments. FIG. 2B illustrates trunnions 19 supporting seal cone 15 on a side of sidewall portion 123B which faces sidewall portion 123A (not shown in FIG. 2B), such that seal cone 15 is at least partially located within the standoff structure 123 of housing 12.

FIG. 2C is a perspective cross-section view through the assembled assembly of FIG. 2A, according to some embodiments, wherein seal cone 15 is shown attached to end piece 14 of cylinder 11, and mounted about spout 17, such that annular exterior surface 152 of seal cone 15 interfaces with seal 16 to form a seal zone 16A between cylinder 11 and spout 17, which is located between sidewall portions 123A and 123B. FIG. 2C illustrates internal tapered surface 150 tapering from a first end 156 of opening 151 to a second end 157 of opening 151, which has a larger diameter than first end 156. FIG. 2C further illustrates both second end 157 of seal cone 15 and outlet opening 172 of spout 17 located in proximity to one another, within interior space 120 of housing 12, defining a feed zone 17A.

The size of the seal cone will depend on the size of the grain separating machine. In some embodiments, the first diameter of the seal cone is between around 6 inches to around 10 inches (e.g., about 8 inches), while the second diameter of the seal cone is between around 9 inches to around 13 inches (e.g. about 11 inches). In such embodiments, the lateral distance between the first diameter and the second diameter may be around 1 to around 4 inches (e.g., about 2 inches). In a specific embodiment, the first diameter of the seal cone is about 8 inches, the second diameter of the seal cone is about 11.25 inches, and the lateral distance between the first and second diameters is about 2.3 inches. In such an embodiment, the internal tapered surface of the seal cone has a rise over run of about 1.4. Of course, the internal tapered surface need not take a straight line from first end 156 to second end 157; it may curve.

Thus, with reference to FIG. 2C, it may be appreciated that both an axial length of seal cone 15, between first and second ends 156, 157, as well as the outward taper of surface 150, from first end 156 to second end 157, can effectively separate the flow of grain (indicated by bold arrows), from spout 17 into cylinder 11 (i.e., the feed zone 17A), from the seal zone. Surprisingly, Applicants have found that separating the seal zone from the feed zone by a relatively small lateral distance significantly improves the capacity of the grain separator. Without intending to be bound by theory, it appears that separating the feed zone from the seal zone reduces the amount of grain backing up against the seal as grain enters the cylinder which, in turn, reduces the amount of grain leakage through the seal at a given grain throughput rate. Accordingly, the length grading machine may be operated at a higher capacity without grain leakage through the seal. It is estimated that capacity will be increased from about 10% to about 20%. Further, since less grain contacts the seal, the potential for seal damage is also significantly reduced.

Figure 3B:
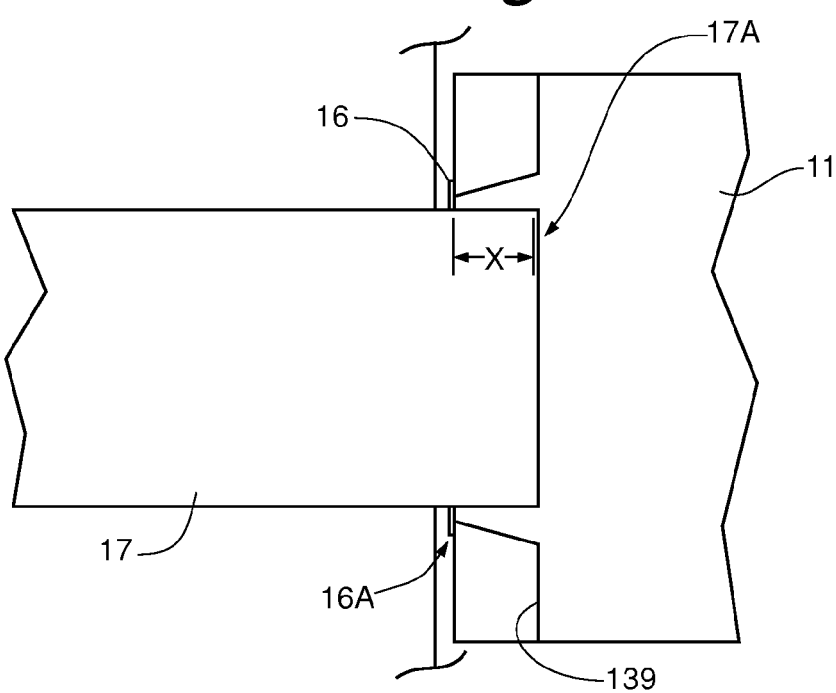
FIG. 3B is a simplified schematic drawing showing the lateral seal location in an embodiment of the invention.

The lateral distance of the feed zone from the seal zone will depend on the size of the grain separating machine. For more specificity, this distance can be represented by the distance between the end surface 139 of the cylinder and the seal 16. This distance is labeled "X" in FIG. 3B. FIG. 3A shows a simplified schematic drawing showing the lateral seal location in a prior art grain separator, while FIG. 3B is a simplified schematic drawing showing the lateral seal location in an embodiment of the invention. In some embodiments the seal zone is separated from the feed zone by a lateral distance of greater than around 1 inch. In other embodiments, the seal zone is separated from the feed zone by a lateral distance of greater than around 1.5 inches. In yet other embodiments, the seal zone is separated from the feed zone by a lateral distance of greater than around 2 inches. In some embodiments, the seal zone is separated from the feed zone by a lateral distance of between about 2.4 inches and about 2.5 inches. In other embodiments, the seal zone is separated from the feed zone by a lateral distance of greater than around 2.5 inches.

Seal 16 can comprise an annular ring shape designed to stop grain leakage between the interior of the cylinder and the spout. Further seal 16 may be made of any appropriate sealing material that is adapted to seal against the annular bearing face of the seal cone and wear well against the rotating seal cone. The seal may be made, for example, from an acetal resin such as Delrin® (DuPont), from polyethylene (particularly ultra high molecular weight polyethylene), poly(tetrafluouroethylene), urethane (particularly ultra high molecular weight polyurethane), felt, or other material. In some embodiments, the seal may provided in two or more segments, as described in U.S. Pat. No. 7,029,393, assigned to the assignee of the present application, the contents of which are hereby incorporated by reference. Such a split seal is useful for easily removing a worn seal and replacing it with a new seal. In embodiments utilizing a split seal, a backing plate 175 may be provided for the split seal, as shown in FIG. 2A.

Figure 4:
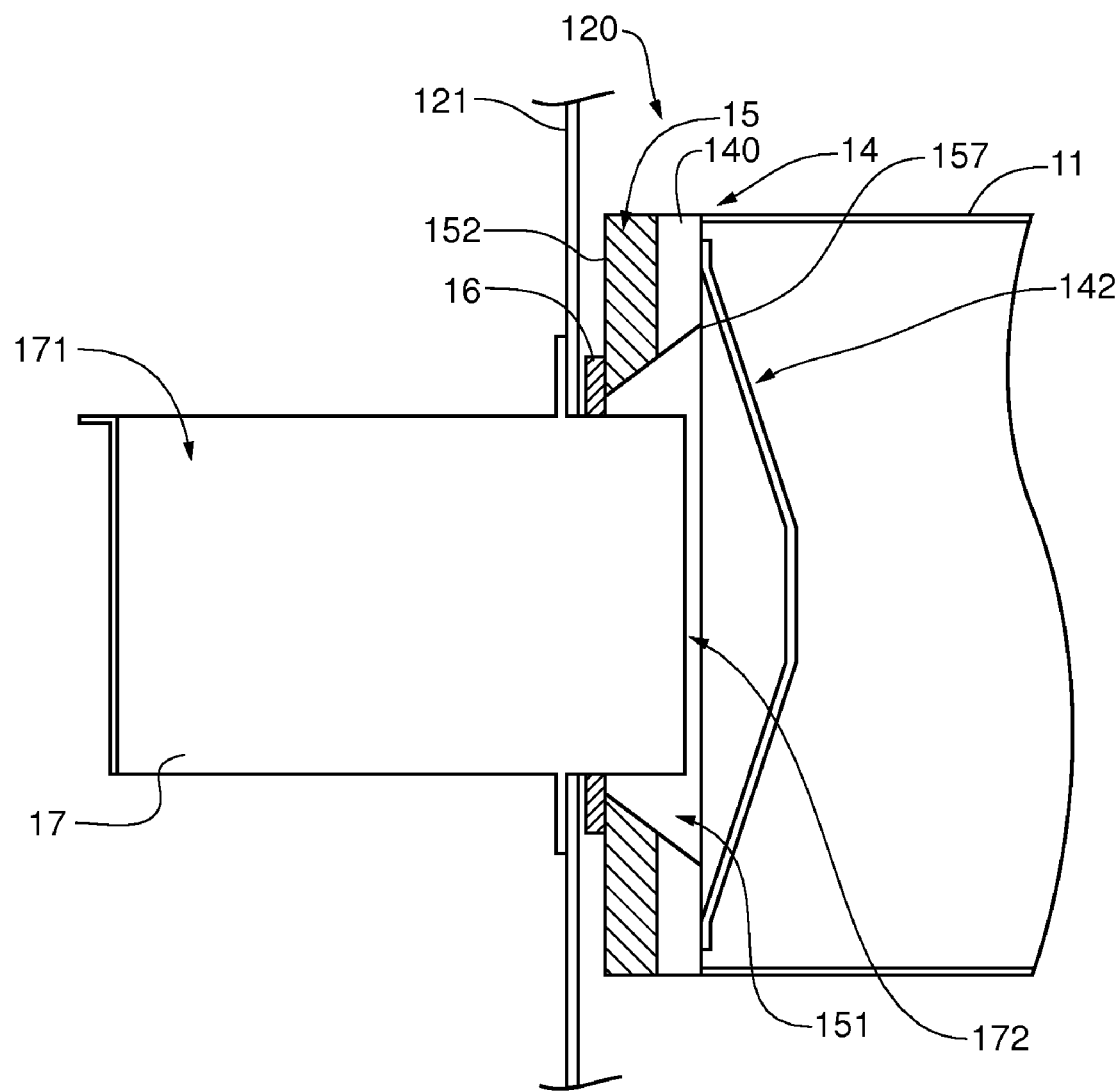
FIG. 4 is a cross-section view through an assembly for mounting the indented cylinder, in conjunction with the spout, to the housing of the grain separator, according to some alternate embodiments of the present invention.

FIG. 4 is a cross-section view through an assembly for mounting indented cylinder 11, in conjunction with spout 17, to housing 12, according to some alternate embodiments of the present invention. In contrast to FIG. 2C, FIG. 4 illustrates an entirety of seal cone 15 located within interior space 120 of housing 12 (i.e., not within a standoff structure). According to FIG. 4, seal cone 15 does not rest on trunnions, as does the embodiment shown in FIG. 2C. Thus cylinder 11 may be supported, at the illustrated end, by the spider structure 142.

An additional shaft and bearing (not shown) can be provided to support the cylinder. Like FIG. 2C, FIG. 4 illustrates annular exterior surface 152 interfacing with the bearing surface of seal 16, to form the seal zone between cylinder 11 and spout 17, and second end 157 of seal cone opening 151, along with outlet opening 172 of spout 17, spaced apart from the seal zone.

Embodiments of the invention also include methods of making and operating any of the embodiments of the grain separators discussed above. In one example, the invention includes a method of providing a grain separator comprising the steps of providing a housing and a rotatable grain separation cylinder within the housing. The cylinder may have an end surface and a grain inlet may have an inlet spout extending through the end surface for conveying grain into the cylinder in a feed zone. Such an embodiment further includes the steps of installing a seal cone having an annular external surface spaced laterally from the feed zone and installing a seal interfacing with the annular external surface, thereby defining a seal zone spaced laterally from the feed zone. In some embodiments, the seal cone increases the capacity of the grain separator.

Embodiments of the invention also include methods of operating any of the grain separator embodiments discussed above. Such embodiments can include the steps of introducing grain into a grain separator and removing the separated grain streams from the grain separator. Grain may be pushed though the grain separator at a higher rate compared to grain separators with traditional seal locations.

Further, embodiments of the invention also include replacing a worn seal on any of the grain separator embodiments discussed above. Such a method includes removing a worn seal and placing a new seal in apposition to a seal cone.

In the foregoing detailed description, the invention has been described with reference to specific embodiments. However, it may be appreciated that various modifications and changes can be made without departing from the scope of the invention.

What is claimed is:

1. A grain separator, comprising:
   a housing;
   a rotatable grain separation cylinder within the housing, the cylinder having an end surface;
   a grain inlet having an inlet spout extending through the end surface for conveying grain into the cylinder in a feed zone;
   an auxiliary end piece functionally connected to the end surface of the cylinder, the auxiliary end piece having an annular external surface spaced laterally from the feed zone; and
   a seal interfacing with the annular external surface, thereby defining a seal zone spaced laterally from the feed zone.

2. The grain separator of claim 1, wherein the seal zone is spaced laterally from the feed zone by more than around 1 inch.

3. The grain separator of claim 1, wherein the seal zone is spaced laterally from the feed zone by more than around 2 inches.

4. The grain separator of claim 1, wherein the auxiliary end piece comprises a seal cone.

5. The grain separator of claim 4, wherein the seal cone has a first diameter and a second diameter and an internal tapered surface between the first diameter and the second diameter.

6. The grain separator of claim 1, wherein the end surface is on an end piece coupled to the cylinder.

7. The grain separator of claim 6, wherein the auxiliary end piece is functionally connected to the end piece.

8. The grain separator of claim 1, wherein the auxiliary end piece is supported by trunnions.

9. The grain separator of claim 1, wherein a sidewall of the housing defines a standoff structure, and the auxiliary end piece is located at least partially within the standoff structure.

10. The grain separator of claim 9, wherein the auxiliary end piece is supported on trunnions mounted within the standoff structure.

11. A grain separator, comprising:
    a housing;
    a rotatable grain separation cylinder within the housing, the cylinder having an end surface;
    a grain inlet having an inlet spout extending through the end surface for conveying grain into the cylinder;
    a seal cone having a first diameter and a second diameter and an internal tapered surface between the first diameter and the second diameter functionally connected to the end surface of the cylinder, the seal cone having an annular external surface opposite the internal tapered surface spaced laterally from the end surface; and
    a seal interfacing with the annular external surface, thereby being spaced laterally from the end surface.

12. The grain separator of claim 11, wherein the seal is spaced laterally from the feed zone by more than around 1 inch.

13. The grain separator of claim 11, wherein the seal is spaced laterally from the feed zone by more than around 2 inches.

14. The grain separator of claim 11, wherein the end surface is on an end piece coupled to the cylinder.

15. The grain separator of claim 14, wherein the seal cone is functionally connected to the end piece.

16. The grain separator of claim 11, wherein the seal cone is supported by trunnions.

17. The grain separator of claim 11, wherein a sidewall of the housing defines a standoff structure, and the seal cone is located at least partially within the standoff structure.

18. The grain separator of claim 17, wherein the seal cone is supported on trunnions mounted within the standoff structure.

19. A method of providing a grain separator, comprising:
    providing a housing, a rotatable grain separation cylinder within the housing, the cylinder having an end surface, and a grain inlet having an inlet spout extending through the end surface for conveying grain into the cylinder in a feed zone;
    installing a seal cone having an annular external surface spaced laterally from the feed zone; and
    installing a seal interfacing with the annular external surface, thereby defining a seal zone spaced laterally from the feed zone.

20. A method according to claim 19, wherein the seal cone increases the capacity of the grain separator.

* * * * *